United States Patent [19]

Orlando et al.

[11] Patent Number: 5,381,655
[45] Date of Patent: Jan. 17, 1995

[54] ADMISSION MIXING DUCT ASSEMBLY

[75] Inventors: Robert J. Orlando, West Chester; Lawrence W. Dunbar, Loveland, both of Ohio

[73] Assignee: General Electric Company, Cincinnati, Ohio

[21] Appl. No.: 58,181

[22] Filed: May 10, 1993

[51] Int. Cl.[6] .................................................. F02K 3/02
[52] U.S. Cl. ..................................... 60/226.3; 60/262
[58] Field of Search ................. 60/262, 261, 244, 263, 60/226.1, 226.3

[56] References Cited

U.S. PATENT DOCUMENTS

| | | |
|---|---|---|
| 2,934,895 | 5/1960 | Gregory et al. .................. 60/244 |
| 3,153,904 | 10/1964 | Ellis et al. . |
| 3,192,712 | 7/1965 | Nash et al. . |
| 3,296,800 | 1/1967 | Keenan et al. . |
| 3,314,437 | 4/1967 | Pike . |
| 3,324,660 | 6/1967 | Lane et al. . |
| 3,477,230 | 11/1969 | Bauger et al. . |
| 3,508,403 | 4/1970 | Neitzel ............................ 60/262 |
| 3,514,955 | 6/1970 | Paulson et al. .................. 60/262 |
| 3,635,029 | 1/1972 | Menioux . |
| 3,879,941 | 4/1975 | Sargisson . |
| 4,039,146 | 8/1977 | Wagenknecht . |
| 4,043,121 | 8/1977 | Thomas et al. . |
| 4,054,030 | 10/1977 | Pedersen . |
| 4,064,692 | 12/1977 | Johnson et al. . |
| 4,068,471 | 7/1978 | Simmons . |
| 4,069,661 | 7/1978 | Rundell et al. . |
| 4,080,785 | 3/1978 | Koff et al. . |
| 4,222,235 | 9/1980 | Adamson et al. . |
| 4,817,378 | 4/1989 | Giffin, III et al. ................ 60/261 |
| 5,117,628 | 6/1992 | Koshoffer ......................... 60/261 |

Primary Examiner—Richard A. Bertsch
Assistant Examiner—Timothy S. Thorpe
Attorney, Agent, or Firm—Jerome C. Squillaro; Bernard E. Shay

[57] ABSTRACT

A variable cycle jet engine is provided with a mixing duct assembly which mixes core engine exhaust gas with bypass air when the engine is operating in a turbofan mode and which blocks flow from the core engine and isolates the core engine from the bypass flow when the engine is operating as a ramjet.

9 Claims, 4 Drawing Sheets

ADMISSION MIXING DUCT ASSEMBLY

RIGHTS OF THE GOVERNMENT

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates in general to jet engines capable of operating either as a turbofan or as a ramjet and relates in particular to an assembly which mixes core engine exhaust flow with bypass air flow during turbofan operation and which isolates the engine turbomachinery from bypass air flow during ramjet operation.

2. Description of Prior Developments

In order to efficiently operate aircraft jet engines at both lower and higher Mach numbers, aircraft engine designers have combined gas turbine engine features with ramjet engine features as shown, for example, in U.S. Pat. Nos. 3,153,904, 3,324,660 and 3,635,029. Current studies for advanced air breathing engines indicate the need for jet engines capable of flight in the Mach 4 to 6 range. At Mach numbers less than about 3, such engines typically operate in a turbofan mode while, at higher Mach numbers, they generally operate as a ramjet.

A flow control assembly is required that will easily allow the engine to transition between turbofan operation and ramjet operation. Such an assembly should provide for thorough mixing of bypass air and core engine exhaust gases during turbofan or core engine operation in order to ensure efficient combustion in the augmenter or afterburner. The assembly should also block inlet airflow through the core engine during ramjet operation so that virtually all inlet air is available for ramjet combustion.

SUMMARY OF THE INVENTION

The present invention has been developed to fulfill the needs noted above and therefore has as an object the provision of a multi-purpose assembly located downstream from the rear turbine frame for mixing bypass air with core engine exhaust gas during turbofan operation and for isolating the core engine from bypass air and inlet air through-flow during ramjet operation. Such selective flow isolation also protects the turbomachinery from the ramjet combustion chamber during ramjet operation.

Briefly, the invention is directed to a compact admission mixing duct assembly ("AMDA") which acts as both a mixer during turbofan operation and as an isolator during ramjet operation and allows jet engine operation in either a turbofan mode or a ramjet mode.

The AMDA includes movable doors separated by flow guides with alternate doors connected via cams and linkages. A significant feature of the AMDA is the combination of alternating door control in conjunction with the flow guides. This arrangement allows the AMDA to act as a mixer during turbofan operation when alternate doors are open and closed.

The capability to close all the doors so as to block flow from the core engine allows the AMDA to function as a core engine isolator. Moving the doors in this fashion allows the assembly to use essentially all the available annular area for the separate flows and therefore results in a more compact, less expensive and lighter AMDA.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
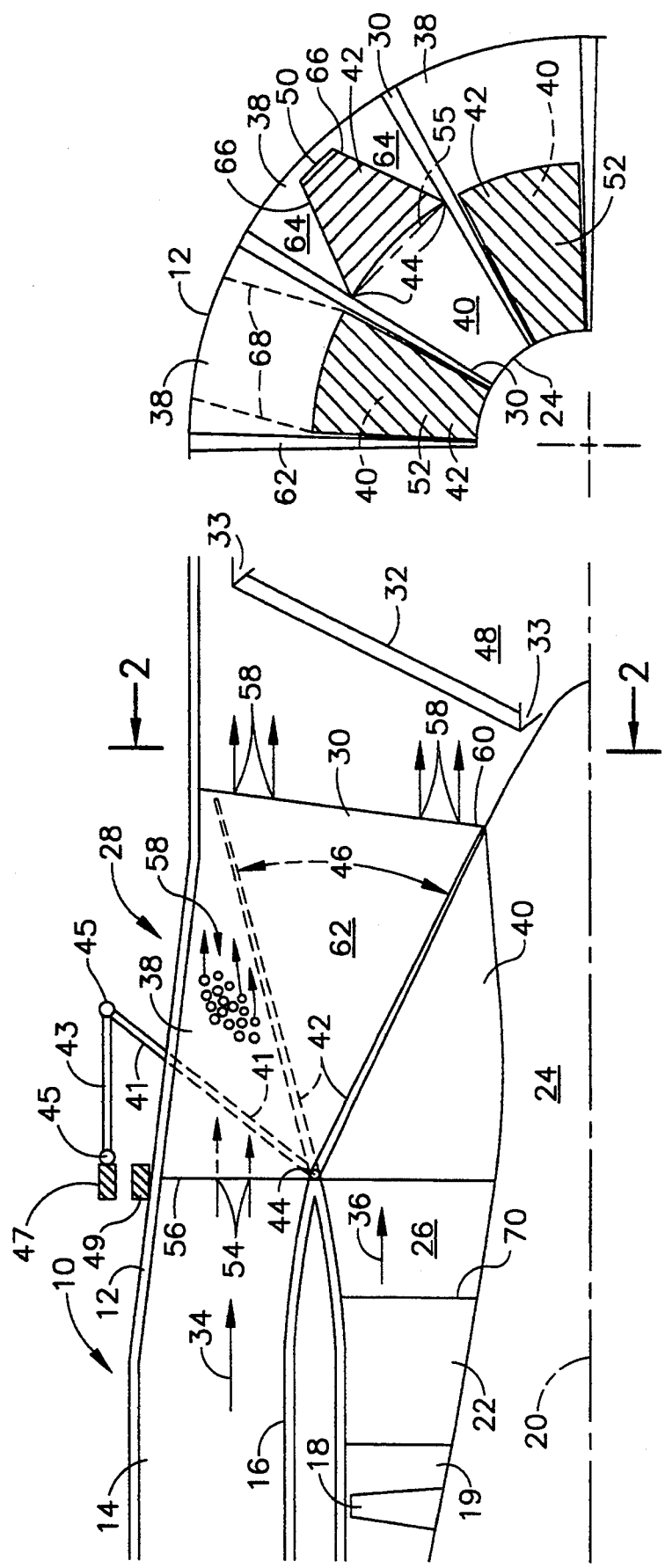
FIG. 1 is a partial schematic view, in axial section, of an admission mixing duct constructed in accordance with the invention.

The present invention will now be described in conjunction with the drawings beginning with FIGS. 1 and 2 which depict a portion of a high speed jet engine 10 of the type capable of operating in either a turbofan mode or in a ramjet mode. Insofar as the general operation of such an engine is well known, only that portion of the engine which mixes engine bypass air with core engine exhaust gases is shown.

Engine 10 includes an annular outer casing or nacelle 12 which defines the radially outer boundary of the aft portion of an annular air bypass duct 14. Bypass duct 14 routes air around a core engine for providing greater engine control during the turbofan mode of operation and for providing combustion air to an aft augmenter or afterburner. The radially inner boundary of bypass duct 14 is defined by an annular inner casing 16.

An aftmost row of turbine blades comprising a row of low pressure turbine blades 18 is mounted downstream of a core engine and its associated turbomachinery. The turbine blades 18 are located radially inwardly of inner casing 16 in an annular core engine exhaust gas duct 19 in a conventional fashion for rotation about engine central axis 20.

An array of turbine outlet guide vanes 22 is mounted between an engine centerbody 24 and the inner casing 16. Hot exhaust gases which drive the low pressure turbine 18 are de-swirled by the turbine outlet guide vanes 22. These exhaust gases then flow axially through exhaust gas duct 19 across space 26 and enter an admission mixing duct assembly (AMDA) 28.

The AMDA 28 includes a plurality of circumferentially-spaced flow guides 30 which extend radially in the manner of a spoked array. The flow guides extend axially along centerbody 24 from a point aft of the turbine outlet guide vanes 22 to a point near the aft end of the centerbody. An annular augmenter or afterburner 32 of known design is mounted within the engine at a position aft of the flow guides 30. Conventional flame holders 33 are provided around the augmenter.

Flow guides 30 may take the shape of planar panels which extend radially between the centerbody 24 and the outer casing 12. As seen in FIG. 1, the flow guides receive both bypass air 34 from bypass duct 14 and core engine exhaust gas 36 issuing from the core engine exhaust gas duct 19 across space 26. In this manner, the flow guides circumferentially divide each of the respective gas flows 34, 36 into a plurality of separate circumferentially-spaced flow paths while providing significant structural support between the outer casing 12 and centerbody 24.

Figure 2:
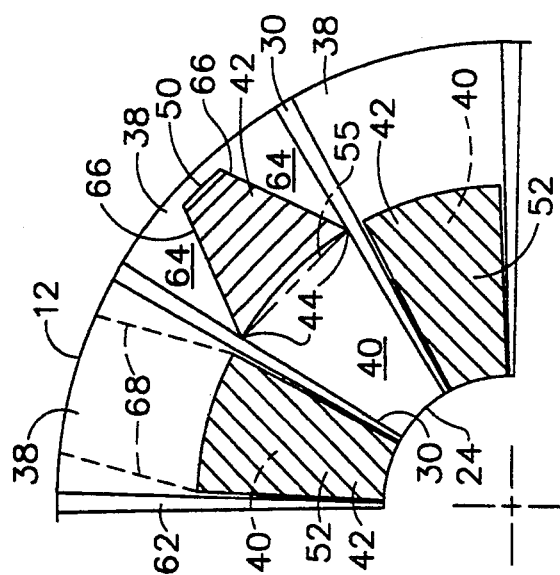
FIG. 2 is a partial schematic view in radial section taken along line 1—1 of FIG. 1.

As seen in FIG. 2, the bypass air 34 is split by flow guides 30 into a circumferentially-extending series of radially outer bypass air mixing ducts 38. The core engine exhaust gas is likewise split into a circumferentially-extending series of radially inner exhaust gas mixing ducts 40. Ducts 38 and 40, which in combination form the above-noted flowpaths between flow guides 30, are further defined at least in part by a plurality of movable flaps or generally sector-shaped doors 42 mounted between each pair of adjacent flow guides 30.

The movable doors 42 may be pivotally mounted adjacent the aft end of inner casing 16 via hinged pin joints 44. As illustrated with respect to the central one of doors 42 shown in Fig. 2, each of doors 42 is pivotally mounted to a pair of circumferentially adjacent flow guides 30 via a pair of hinged pin joints 44 such that each door 42 is pivotable about chord line 55 which connects the adjacent pair of flow guides 30. Any suitable actuator may be used for controlling the position of doors 42 such as hydraulic piston actuators or electric drive motors. As seen in FIG. 1, each door 42 may be controllably and selectively driven over arc 46 by an actuation handle or lever 41 mounted within each door so as to vary the cross-sectional areas of ducts 38 and 40. Links 43 interconnect alternate doors 42 via ball joints 45 to an outer actuation ring 47 and an inner actuation ring 49.

As can be appreciated, the AMDA is capable of mixing a variable amount of bypass air 34 with a variable amount of core engine exhaust gas 36 as these flows, which were previously isolated by the inner casing 16, are free to mix and commingle as they travel axially between the flow guides 30. Moreover, by closing all of the movable doors 42 radially inwardly to the position shown in solid lines in FIG. 1, the movable doors 42 isolate and protect the core engine and turbomachinery during ramjet operation. The turbine outlet guide vanes 22 and low pressure turbine blades 18 are protected from the heat generated in ramjet combustion chamber 48 as the movable doors 42 in their closed position block flow from the core engine and thereby causing virtually all inlet flow to travel through bypass duct 14.

During turbofan operation, movable doors 42 may be selectively positioned in their open position 50 and in their closed position 52 in an alternating fashion as shown in FIG. 2. Alternate doors 42 may be simultaneously opened and closed by one or more annular actuation cams or actuation rings 47,49 such as noted above which operate alternate doors. In this manner, half of the movable doors are driven open and half are driven closed when the engine 10 is operating in the mixing or turbofan mode. During ramjet operation, all of the movable doors are closed to isolate the turbomachinery from the flow from bypass duct 14 and to substantially block the flow of air through the exhaust duct 19.

The separation of the bypass air 34 and exhaust gas 36 by the flow guides 30 and movable doors 42 allows for the formation of circumferentially alternating channels for directing the respective flows through an axially and radially-extending series of tortuous mixing paths for enhancing the mixing of these flows. Further mixing may be produced by forming the flow guides 30 as hollow panels through which bypass air may travel.

Inlet ports 54 may be formed along the leading edge 56 of each flow guide 30 for admitting bypass air into and through the panels. Exhaust ports 58 may be formed along the trailing edge 60 of each flow guide as well as along the side surfaces 62 of the flow guides for exhausting, mixing and distributing the bypass air into the exhaust gas.

When the movable doors 42 are positioned in their open or up position 50, a circumferentially extending wedge-shaped gap 64 is left between each flow guide 30 and the adjacent edge 66 of each movable door. Gaps 64 could be reduced by increasing the circumferential width of each flow guide 30 along its trailing edge as shown in phantom at 68 in FIG. 2.

Figure 3:
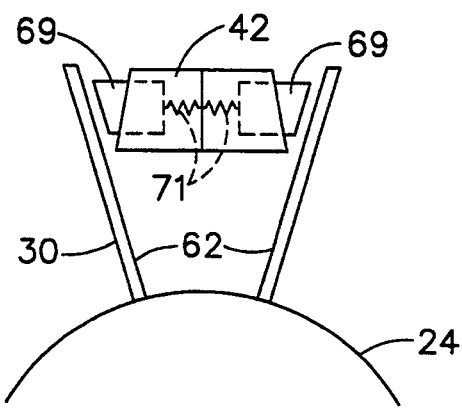
FIG. 3 is a partial aft view looking forward along a similar radial section as taken in FIG. 2, showing an alternate design for reducing flow around the movable doors.

An additional set of flaps could also be employed to reduce gaps 64 or, as shown in FIG. 3, a pair of spring-loaded flow guide followers 69 may be mounted within each door 42. Spring members 71 circumferentially bias each flow guide follower into sliding contact with the confronting side surfaces of each door. However, it may not be necessary to reduce the size of gaps 64 since the purpose of the AMDA is to mix the bypass air 34 with the exhaust gas 36 and the gaps 64 tend to enhance this mixing.

The extent of movement of the movable doors 42 may vary depending on the particular engine application. Moreover, for a particular engine cycle, it is possible to fix half of the movable doors in their closed positions 52 during all flight conditions. This would significantly simplify the design of the AMDA, but not affect its mixing and isolation functions.

As indicated above, a space 26 has been left between the trailing edges 70 of the turbine outlet guide vane 22 and the leading edges 56 of the flow guides 30. This space is required to allow the core flow exhaust gas 36 to migrate circumferentially to every other duct 40 while minimizing the static pressure circumferential variation at the exit of the low pressure turbine blades 18.

Figure 4:
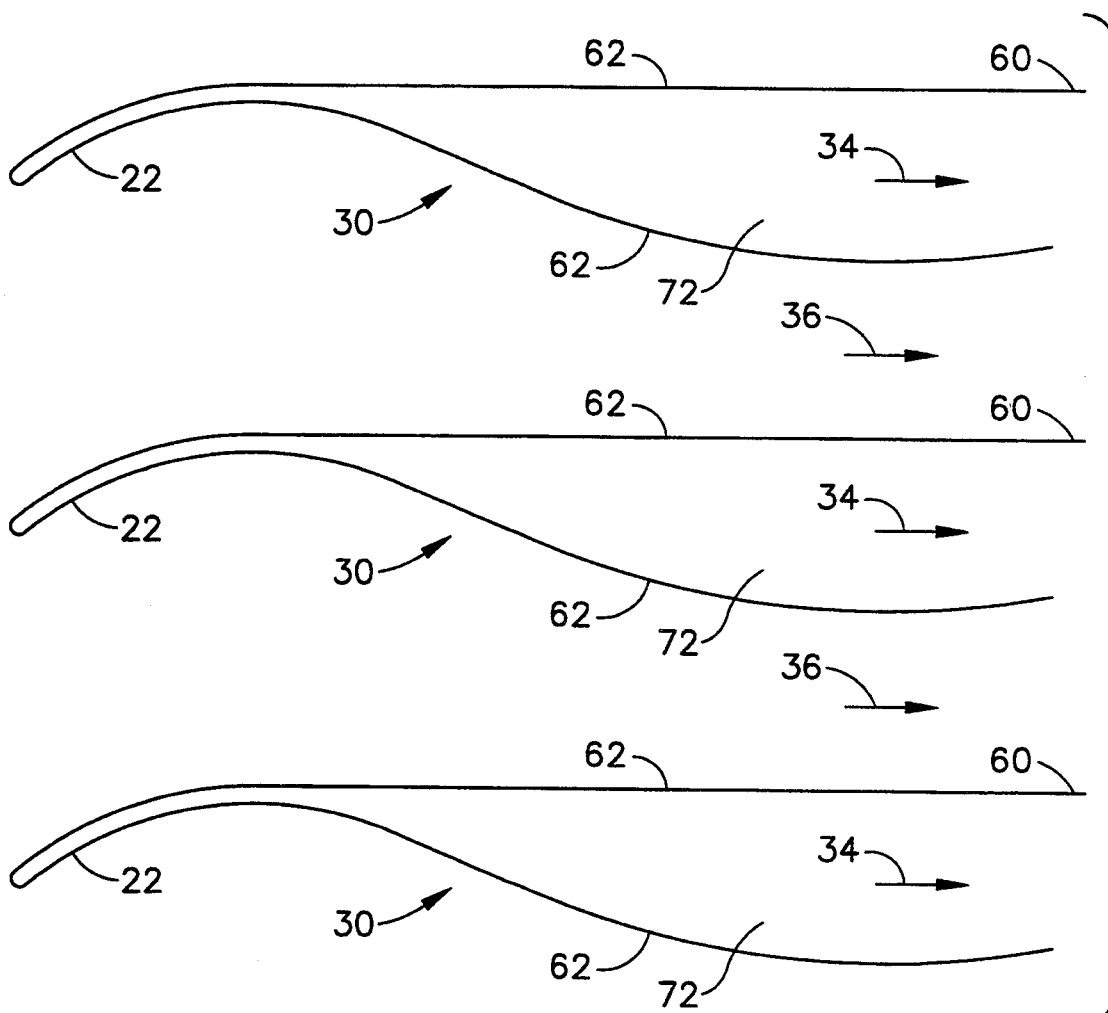
FIG. 4 is a schematic top plan view of an alternate embodiment of the invention wherein turbine outlet guide vanes are formed integrally with admission duct flow guides.
Figure 5:
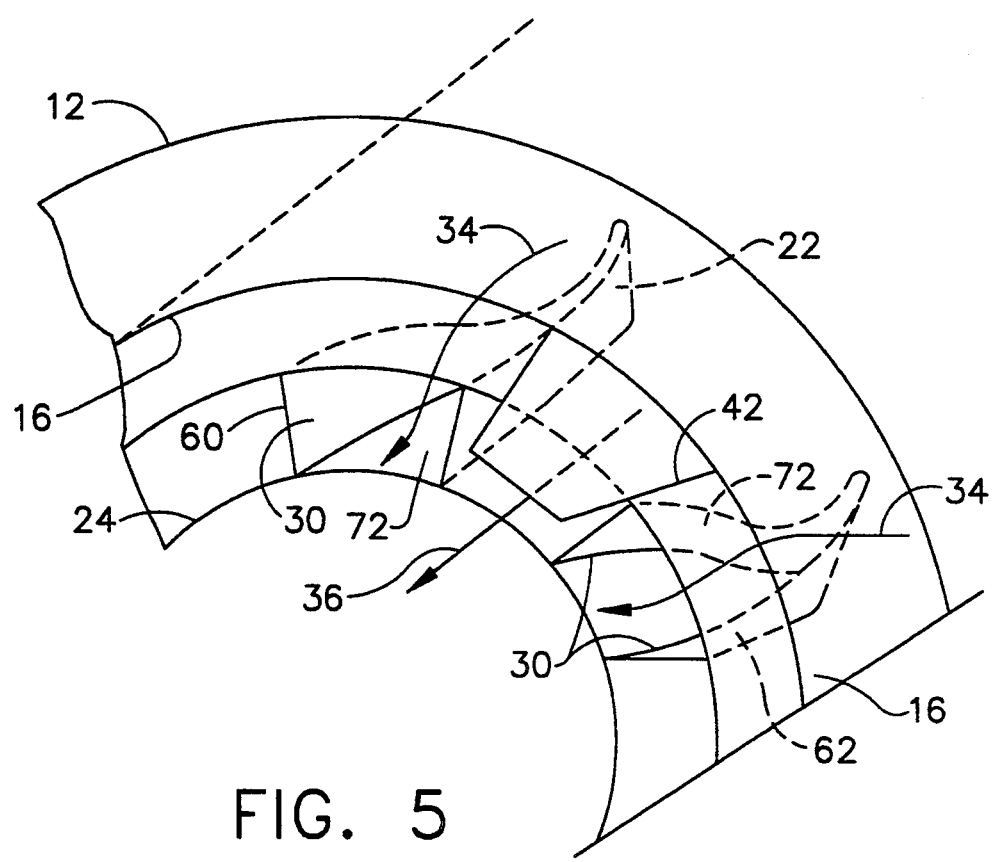
FIG. 5 is a schematic partial perspective view detailing the general features of FIG. 4.

As an alternative, it is possible to construct the turbine outlet guide vanes 22 as an integral part of the flow guides 30. As seen in FIGS. 4 and 5, the flow of exhaust gas 36 is turned and diffused between the airfoil shaped front portion of these contoured flow guides which serve as outlet guide vanes 22. The aft portion of these flow guides opens up internally to provide internal space 72 for the rear bypass duct flow, i.e. bypass air 34.

Figure 6:
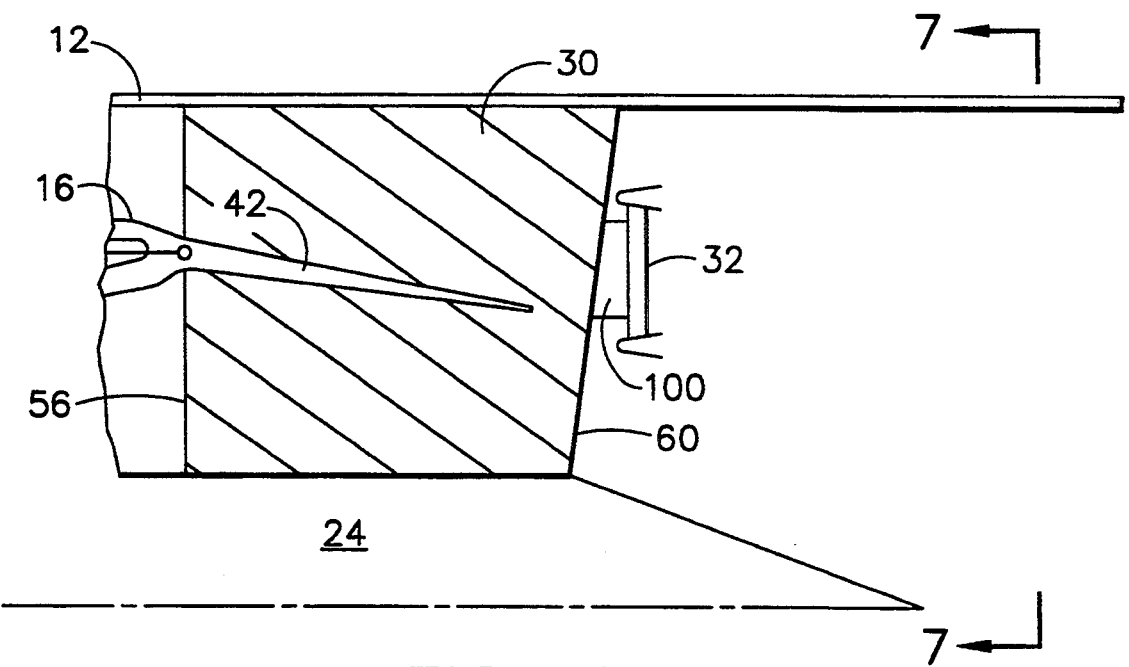
FIG. 6 is a partial schematic view in axial section of an alternate embodiment of the invention wherein an augmenter is constructed integrally with the flow guides.
Figure 7:
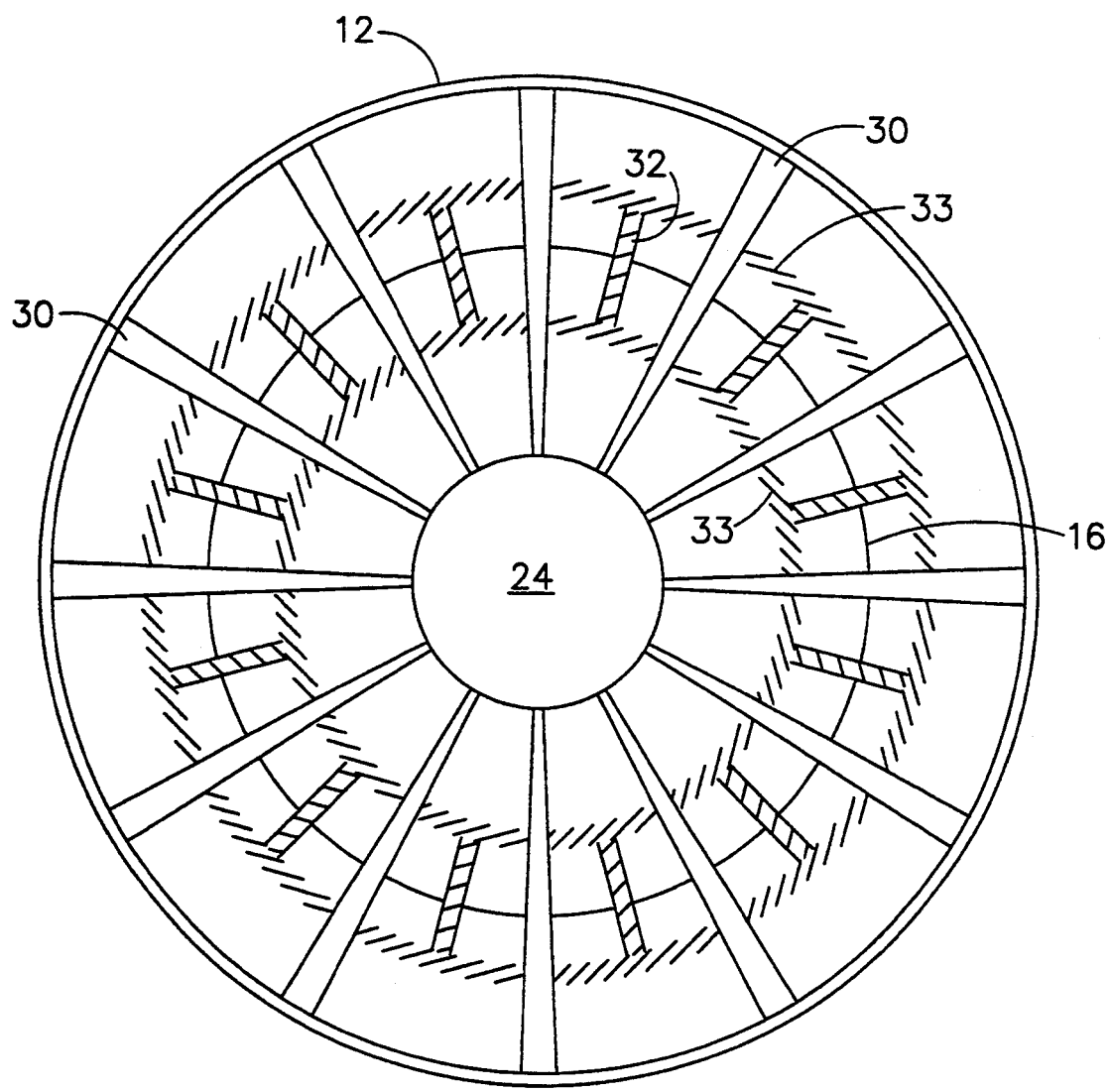
FIG. 7 is an aft view looking forward along section line 7—7 of FIG. 6.

Thus, the core flow 36 is squeezed circumferentially between sidewalls 62 while diffusing radially to make room for the bypass air flow 34. This is done in such a manner so as to minimize the static pressure circumferential variation just behind the low pressure turbine blades 18. It is also possible to incorporate the augmenter 32 as part of the trailing edges 60 of the flow guides 30. As seen in FIGS. 6 and 7, the augmenter is connected to the trailing edges 60 by brackets 100.

These modifications allow for a more compact engine design.

There has been disclosed heretofore the best embodiment of the invention presently contemplated. However, it is to be understood that various changes and modifications may be made thereto without departing from the spirit of invention.

What is claimed is:

1. An apparatus for mixing bypass air and exhaust gas within a jet engine, comprising:
    annular bypass duct means for channeling bypass air through said engine;
    annular exhaust gas duct means located radially inwardly of said annular bypass duct means for channeling core engine exhaust gas through said engine;
    a plurality of circumferentially spaced flow guides for receiving said bypass air from said bypass duct and for receiving said exhaust gas from said exhaust gas duct; and
    a plurality of movable doors mounted between and cooperating with said flow guides so as to define a circumferentially extending series of radially outer bypass air mixing ducts and a circumferentially extending series of radially inner exhaust gas mixing ducts;
    wherein said plurality of movable doors comprises a plurality of generally sector-shaped doors which each pivot about a chord line connecting an adjacent pair of said flow guides, said doors being pivotable into said bypass air mixing ducts and into said exhaust gas mixing ducts so as to control the respective flows of said bypass air and said exhaust gas therethrough.

2. The apparatus of claim 1, wherein said movable doors comprise means for substantially blocking flow of said exhaust gas through said exhaust gas ducts.

3. The apparatus of claim 1, further comprising a centerbody and wherein said movable doors cooperate with said flow guides and said centerbody to substantially block said flow of exhaust gas through said apparatus.

4. The apparatus of claim 1, further comprising an aftmost row of turbine blades located within said exhaust gas duct means at a position upstream of said movable doors and an augmenter located downstream of said movable doors.

5. The apparatus of claim 4, further comprising turbine outlet guide means disposed within said exhaust gas duct means downstream of said aftmost row of turbine blades and wherein said flow guides are located downstream from said turbine outlet guide means.

6. The apparatus of claim 1, wherein said flow guides comprise outlet guide means integrally connected thereto for de-swirling said exhaust gas.

7. The apparatus of claim 1, wherein said flow guides comprise hollow panels having inlet ports and outlet ports formed therein for respectively admitting said bypass air into said flow guides and mixing said bypass air with said exhaust gas.

8. The apparatus of claim 1, further comprising an augmenter integrally connected to an aft end portion of said flow guides.

9. The apparatus of claim 1, further comprising at least one fixed door located between said flow guides so as to permanently block a portion of said exhaust gas from flowing through said apparatus.

* * * * *